US012508184B2

(12) United States Patent
Davis et al.

(10) Patent No.: US 12,508,184 B2
(45) Date of Patent: Dec. 30, 2025

(54) SUPPORT BRACKET FOR A CASKET LID

(71) Applicant: Vandor Group, Inc., Richmond, IN (US)

(72) Inventors: Justin F. Davis, Richmond, IN (US); Brent Wilber, Richmond, IN (US)

(73) Assignee: Vandor Group, Inc., Richmond, IN (US)

( * ) Notice: Subject to any disclaimer, the term of this patent is extended or adjusted under 35 U.S.C. 154(b) by 0 days.

(21) Appl. No.: 18/522,360

(22) Filed: Nov. 29, 2023

(65) Prior Publication Data

US 2024/0180767 A1 Jun. 6, 2024

Related U.S. Application Data

(60) Provisional application No. 63/386,063, filed on Dec. 5, 2022.

(51) Int. Cl.
*A61G 17/02* (2006.01)

(52) U.S. Cl.
CPC .................................. *A61G 17/032* (2017.05)

(58) Field of Classification Search
CPC ................ A61G 17/028; A61G 17/032; A61G 17/0405; E05C 17/02; E05C 17/025; E05C 17/047; E05C 17/54
See application file for complete search history.

(56) References Cited

U.S. PATENT DOCUMENTS

| | | | | | |
|---|---|---|---|---|---|
| 56,287 | A * | 7/1866 | Sprague | A61G 17/04 | 27/16 |
| 601,037 | A * | 3/1898 | Garrison | A61G 17/028 | 27/18 |
| 736,714 | A * | 8/1903 | Gendron | E05F 1/1016 | 16/80 |
| 908,143 | A * | 12/1908 | Rosine | E05C 17/54 | 292/343 |
| 1,378,298 | A * | 5/1921 | Watts | A61G 17/032 | 217/60 D |
| 2,156,872 | A * | 5/1939 | Roberts | A61G 17/032 | 27/18 |
| 2,848,783 | A * | 8/1958 | Keller, Jr. | A61G 17/0405 | 292/276 |
| 3,060,546 | A * | 10/1962 | Nelson | A61G 17/032 | 27/18 |
| 3,151,375 | A * | 10/1964 | Schevenell | A61G 17/032 | 27/16 |
| 3,959,859 | A * | 6/1976 | Stein, Jr. | A61G 17/032 | 27/18 |
| 4,524,496 | A * | 6/1985 | Tehsildar | A61G 17/032 | 403/92 |
| 4,831,688 | A * | 5/1989 | Deininger | E05F 5/06 | 292/288 |

(Continued)

FOREIGN PATENT DOCUMENTS

CA 2013968 C * 8/1998 ............. E05C 17/28

*Primary Examiner* — William L Miller
(74) *Attorney, Agent, or Firm* — Maginot, Moore & Beck LLP

(57) ABSTRACT

A support bracket for a casket lid of a casket includes a first leg configured to mount to an interior surface of a crown rail of the casket lid, a second leg connected to the first leg and configured to connect to a brace that that braces the casket lid, and a support rib connected to the first leg and extending in a direction toward the second leg.

9 Claims, 10 Drawing Sheets

(56) References Cited

U.S. PATENT DOCUMENTS

| | | | | | |
|---|---|---|---|---|---|
| 4,962,574 | A * | 10/1990 | Estes | A61G 17/028 | 27/19 |
| 5,570,493 | A * | 11/1996 | Gulick | A61G 17/028 | 27/14 |
| 5,765,268 | A * | 6/1998 | MacKirdy | A61G 17/032 | 27/18 |
| 7,866,014 | B2 * | 1/2011 | Bovard | A61G 17/028 | 27/18 |
| 12,274,649 | B1 * | 4/2025 | Thomas | A61G 17/028 | |
| D1,076,660 | S * | 5/2025 | Wouters | C02F 1/325 | D8/380 |
| 2007/0246954 | A1 * | 10/2007 | Ollinger | E05C 17/54 | 292/338 |
| 2008/0309100 | A1 * | 12/2008 | Ollinger | E05C 17/54 | 292/339 |
| 2009/0282658 | A1 * | 11/2009 | Bovard | E05D 7/0009 | 27/16 |
| 2012/0260476 | A1 * | 10/2012 | Burnside | A61G 17/007 | 27/16 |
| 2015/0224010 | A1 * | 8/2015 | Laccitiello | A61G 17/032 | 27/18 |
| 2019/0264479 | A1 * | 8/2019 | Mooney | E05C 17/54 | |
| 2020/0102774 | A1 * | 4/2020 | Maher | E05C 17/047 | |
| 2022/0042358 | A1 * | 2/2022 | Gordon | E05C 17/52 | |

* cited by examiner

SUPPORT BRACKET FOR A CASKET LID

CROSS-REFERENCE TO RELATED APPLICATION

This application claims priority to U.S. Provisional Patent Application Ser. No. 63/386,063 entitled "Support Bracket for a Casket Lid," which was filed Dec. 5, 2022, the disclosure of which is incorporated herein by reference in its entirety.

TECHNICAL FIELD

This disclosure relates generally to casket arrangements, and, more particularly, to a support bracket for a casket lid.

BACKGROUND

At times, for example during a funeral viewing, it is necessary for the lid of a casket to be propped open. Typically, the lid of the casket is propped open using a lid support to prevent the lid from inadvertently closing. Upon completion of the viewing, the brace is manually unlocked to allow the lid to be closed. If, however, the lid is pressed down while the brace is locked, the brace can cause damage to the casket at the locations at which the brace is mounted. Accordingly, it would be beneficial for a casket to be capable of withstanding force applied to close the lid without unlocking the lid brace.

SUMMARY

In one embodiment, a support bracket for supporting a casket lid of a casket includes a first leg configured to mount to an interior surface of a crown rail of the casket lid, a second leg connected to the first leg and configured to connect to a brace that braces the casket lid, and a support rib connected to the first leg and extending in a direction toward the second leg.

In another embodiment according to the disclosure, a lid support arrangement for supporting a casket lid of a casket includes a lid support brace configured to operably connect to a box of the casket, and a support bracket. The support bracket includes a first leg configured to mount to an interior surface of a crown rail of the casket lid, a second leg connected to the first leg and connected to the lid support brace, and a support rib connected to the first leg and extending in a direction toward the second leg.

In a further embodiment, a casket includes a box portion, a casket lid having a crown rail, and a lid support arrangement that includes a lid support brace operably connected to the box portion and a support bracket. The support bracket includes a first leg configured to mount to an interior surface of the crown rail of the casket lid, a second leg connected to the first leg and to the lid support brace, and a support rib connected to the first leg and extending in a direction toward the second leg.

DETAILED DESCRIPTION

Figure 1:
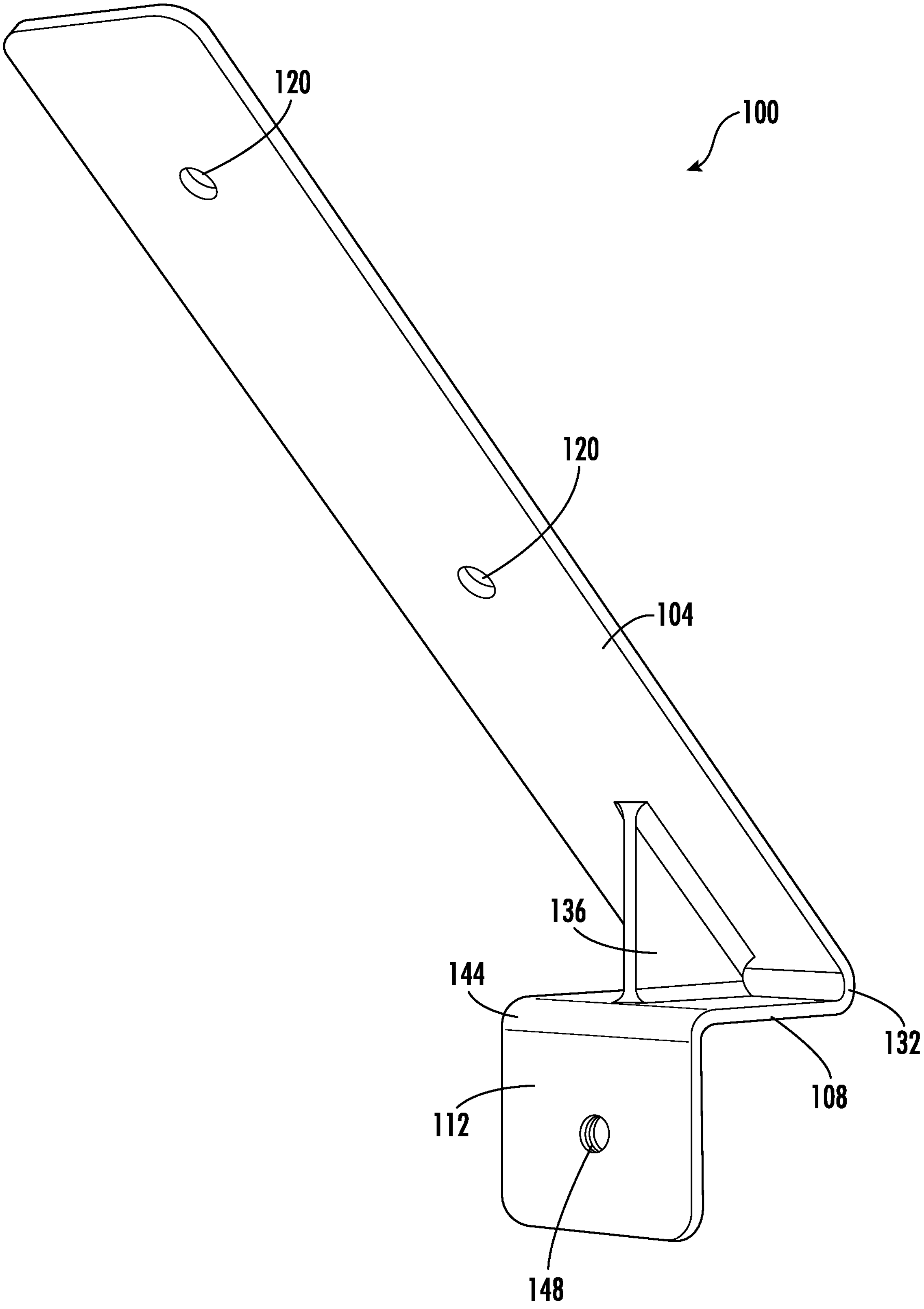
FIG. 1 is a perspective view of a casket support bracket according to the disclosure.

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

As used herein, the term "approximately" encompasses lengths within ±10% of the reference length and angles within ±5 degrees of the reference angle.

FIGS. 1-4 illustrate a support bracket 100 for a casket lid 304 according to the disclosure. The support bracket 100 includes a first leg 104 also referred to as an angled leg, an intermediate leg 108 also referred to as a horizontal leg, and a second leg 112 also referred to as a vertical leg. The reader should appreciate that the identification of angled, horizontal, and vertical directions refer to the configuration when the casket is closed. These identifiers are for illustrative purposes only and should not be considered limiting, as the support bracket 100 can be arranged in different orientations depending on the configuration of the casket on which the support bracket 100 is installed.

The first leg 104 defines at least one hole 120 configured to receive a fastener that fastens the first leg 104 to the crown rail of the casket lid 304. In the illustrated embodiment, the first leg 104 defines two holes spaced apart from one another along the length of the first leg 104, though the reader should appreciate that in other embodiments, the first leg 104 may include only one hole 120 or more than two holes 120, and/or one or more of the holes 120 may be aligned horizontally with one another. In further embodiments, the first leg 104 may include a different mounting arrangement, for example a friction mount, an adhesive, one or more projections, and the like.

Referring back to FIG. 1, the first leg 104 is connected to the intermediate leg 108 by a rounded corner 132. The reader should appreciate, however, that the corner 132 may be a sharp corner or a chamfered corner. A support rib 136 extends vertically between the upper surface of the intermediate leg 108 and the lower surface of the first leg 104 in a lengthwise direction of the first leg 104 substantially along the center of the first leg 104. In the illustrated embodiment, the support rib 136 extends in a plane (i.e. the main extent of the support rib 136 defines a plane) that is substantially perpendicular or perpendicular to a plane in which the intermediate leg 108 extends (i.e. the main extent of the intermediate leg 108 defines the plane), and the plane of the support rib bisects the first, intermediate, and second legs 104, 108, 112 of the support brace 100.

The support rib 136 is connected to both the first leg 104 and the intermediate leg 108. In particular, the support rib 136 may be materially joined to one of or both of the first and intermediate legs 104, 108 by, for example, a welded joint. In other embodiments, the support rib 136 may be integrally formed with one or both of the first and intermediate legs 104, 108, or the support rib 136 may be fastened to one or both of the first and intermediate legs 104, 108 using fasteners, clips, a force fit, or any other desired connection.

The support rib 136 provides additional structural strength for the support bracket 100 to keep the first and intermediate legs 104, 108 at the desired angular position relative to one another. In one particular embodiment, the support rib 136 is formed of sheet metal, e.g. sheet steel, having a thickness of between approximately 0.06 inches and approximately 0.10 inches. In other embodiments, the support rib 136 may be formed of another material, for example a plastic, resin, fiber-reinforced resin or plastic, or any other suitable material.

Figure 13:
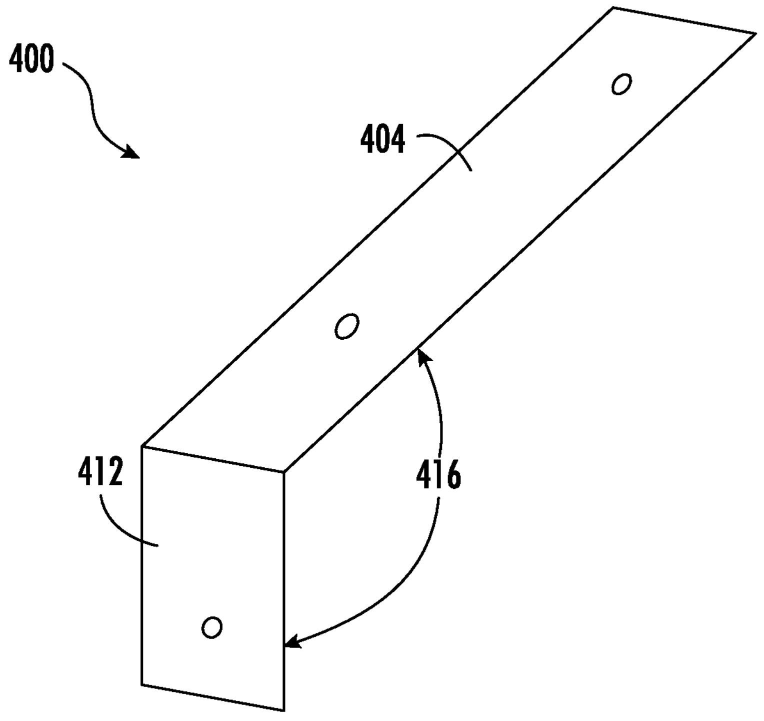
FIG. 13 is a perspective view of another casket support bracket according to the disclosure.

In some embodiments, the support bracket 100 may be formed of a material with high strength or with sufficient thickness such that a support rib is not present between the first and intermediate legs (see FIG. 13). In other embodiments, the support rib may be arranged across the width of the first leg 104 rather than centrally along the length of the first leg (see, e.g., FIGS. 5-8). In still further embodiments, there may be more than one support rib, and/or the support rib(s) may be aligned in any desired arrangement to provide the desired structural strength.

The second leg 112 is connected to the intermediate leg 108 by a rounded corner 144, though again the reader should appreciate that the corner 144 may be a sharp corner or a chamfered corner. At least one hole 148 is defined in the second leg 112. In the illustrated embodiment, the at least one hole 148 is a threaded through hole, though in other embodiments the hole 148 is not threaded, and in further embodiments the hole 148 may be a threaded blind hole. Alternatively, the second leg 112 may include a different connection arrangement for connecting to a support brace 328 such as, for example, a weld or an embossed portion.

Figure 2:
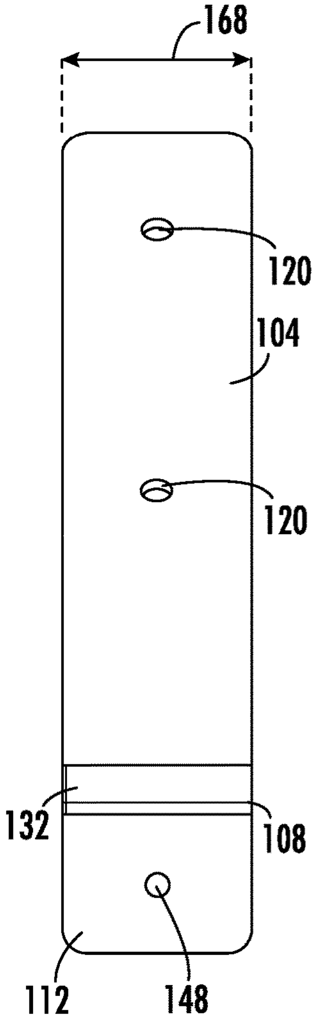
FIG. 2 is a back view of the casket support bracket of FIG. 1.
Figure 3:
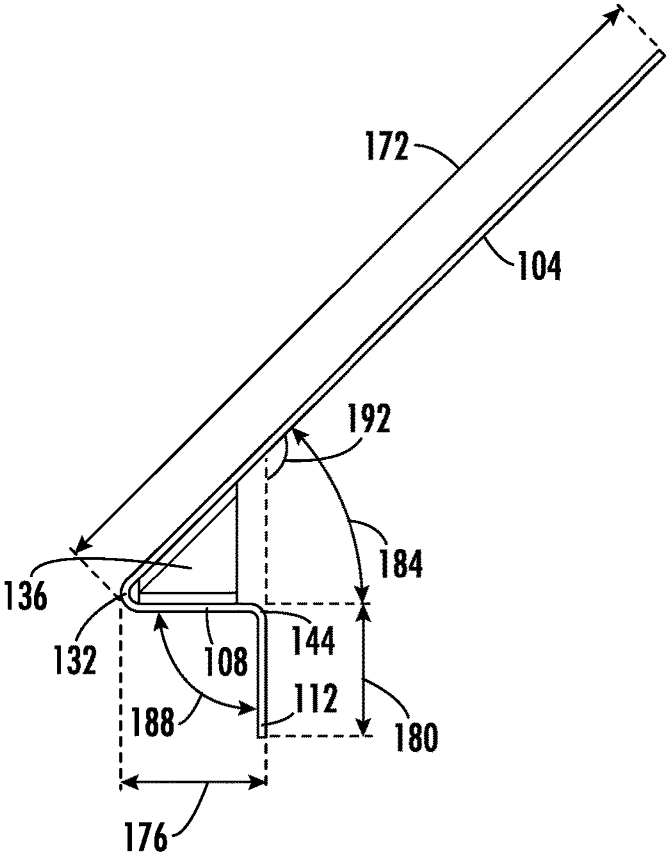
FIG. 3 is a left side view of the casket support bracket of FIG. 1.
Figure 4:
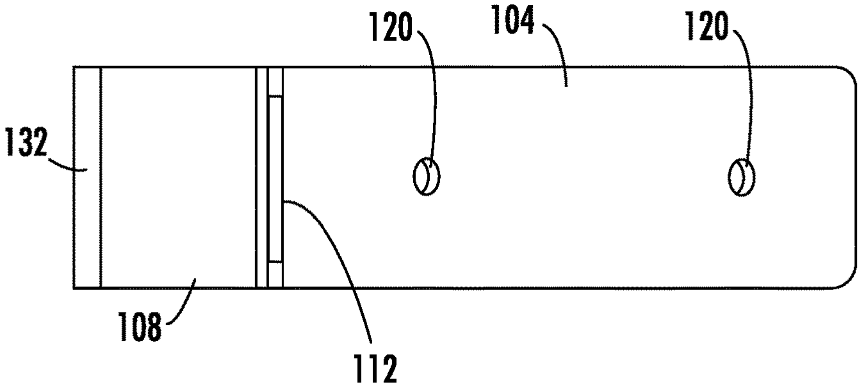
FIG. 4 is a bottom view of the casket support bracket of FIG. 1.
Figure 5:
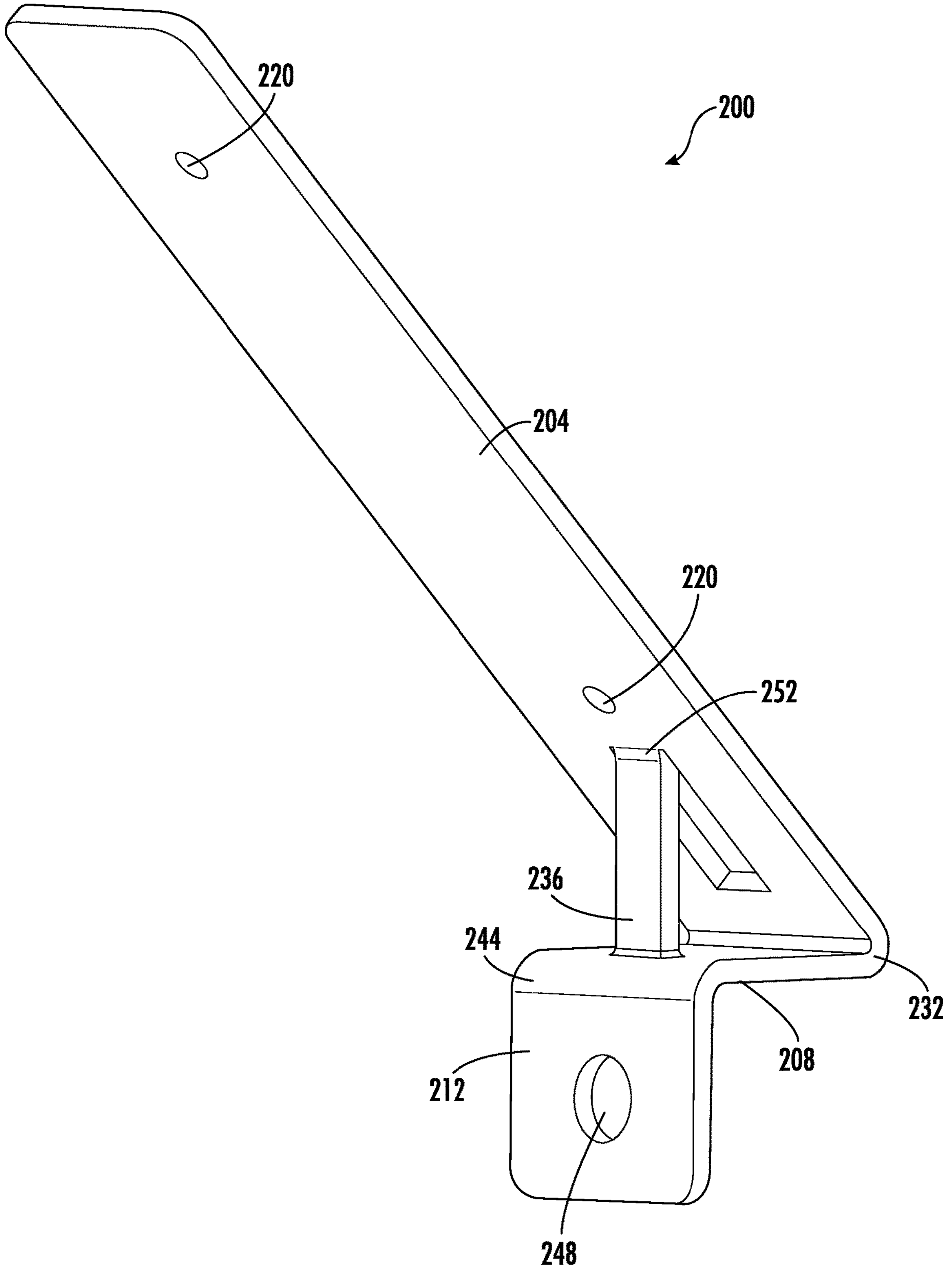
FIG. 5 is a perspective view of a casket support bracket according to the disclosure.
Figure 6:
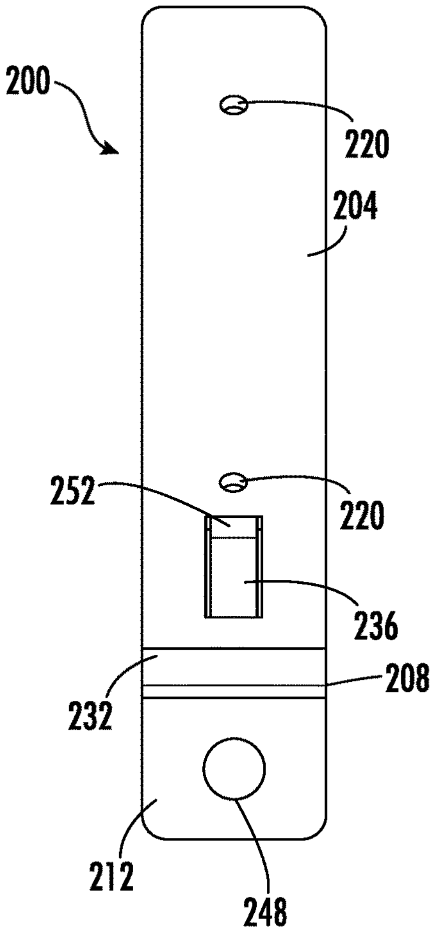
FIG. 6 is a back view of the casket support bracket of FIG. 5.

Referring particularly to FIGS. 2 and 3, some exemplary configurations of the support bracket 100 will be described. The reader should appreciate that the dimensions may vary depending on the casket to which the support bracket 100 is installed.

In some embodiments, the support bracket 100 is formed of steel having a thickness of between approximately 1/16 inch and approximately 1/8 inch. In other embodiments, a different thickness or type of steel may be used, or the support bracket 100 may be formed of another material, for example a plastic, a reinforced composite, or aluminum.

The support bracket 100 has a width 168, and each of the first, intermediate, and second legs 104, 108, 112 has a respective length 172, 176, 180. The first and intermediate legs 104, 108 are at a first angle 184 relative to one another, while the intermediate and second legs 108, 112 are at a second angle 188 relative to one another. The first and second legs 104, 112 therefore define an angle 192 relative to one another at the intersection of an extension of the second leg 112 with the first leg 104. The width 168, lengths 172, 176, 180, and the angles 184, 188 may vary in different embodiments depending on the configuration of the casket on which the support bracket 100 is installed, and on the force that the support bracket 100 is designed to resist.

In various embodiments, for example, the width 168 may be between approximately 0.5 inches and approximately 2 inches, or between approximately 0.75 inches and approximately 1.25 inches. In the illustrated embodiment, the width 168 is approximately 1 inch. The length 172 of the first leg 104 may be between approximately 2 inches and approximately 7 inches or between approximately 3 inches and approximately 6 inches. In the illustrated embodiment, the length 172 of the first leg 104 is approximately 5 inches. In some configurations of the support bracket 100, the length 176 of the intermediate leg 108 may be between approximately 0.2 inches and approximately 1.5 inches or between approximately 0.5 inches and approximately 1.3 inches. In the support bracket depicted, the length 176 of the intermediate leg 108 is approximately 0.94 inches. The length 180 of the second leg 112 in different embodiments may be between approximately 0.2 inches and approximately 1.5 inches, or between approximately 0.5 inches and approximately 1.3 inches. In the illustrated embodiment, the length 180 of the second leg 112 is approximately 0.88 inches.

In different embodiments, the angle 184 between the first and intermediate legs 104, 108 is between approximately 30 degrees and approximately 60 degrees, between approximately 40 degrees and approximately 60 degrees, or between approximately 40 degrees and approximately 50 degrees. In the illustrated embodiment, the angle 184 is approximately 45 degrees. The angle 188 between the intermediate and second legs 108, 112 may be, for example between approximately 75 degrees and approximately 105 degrees. In the illustrated embodiment, the angle 188 between the intermediate and second legs 108, 112 is approximately 90 degrees. As a result, the angle 192 formed between the first leg 104 and the second leg 112 in the illustrated embodiment is approximately 135 degrees. In various embodiments, the angle 192 between the first and second legs 104, 112 may be between approximately 120 degrees and approximately 150 degrees, or between approximately 125 and approximately 145 degrees.

Another embodiment of a support bracket 200 is depicted in FIGS. 5-8. The support bracket 200 is generally similar to the support bracket 100 described above, and only the differences will be described in detail herein. The support bracket 200 includes a first leg 204, an intermediate leg 208, and a second leg 212 configured similarly to the legs of the support bracket 100. Two holes 220 are defined through the first leg 204, generally centered along the longitudinal axis of the support bracket 200. In one embodiment, the holes 220 may have a diameter of, for example, between approximately 0.11 inches and approximately 0.21 inches, and in another embodiment have a diameter of approximately 0.16 inches.

A through hole 248 is also defined entirely through the second leg 212. In one embodiment, the through hole 248 is not threaded and has a diameter of between approximately 0.20 and approximately 0.50 inches, and in a specific embodiment, a diameter of approximately 0.32 inches. In a further embodiment, the hole 248 in the second leg 212 may instead be a threaded through hole, as in the embodiment illustrated in FIGS. 1-4, or a threaded blind hole.

In contrast to the embodiment of FIGS. 1-4, the support rib 236 is formed integrally and monolithically with the first leg 204 or, in other words, the support rib 236 is formed from the same starting material blank 201 (FIG. 8) as the first, intermediate, and second legs 204, 208, 212. In particular, the support rib 236 is formed as a flap of the material of the first leg 204 that is bent out of the plane of the first leg at a bending joint 252 and instead runs perpendicular to the plane defined by the top surface of the intermediate leg 208 and substantially parallel to the plane defined by the second leg 212. The support rib 236 is materially joined to the top surface of the intermediate leg 208 by, for example, being welded to the intermediate leg 208.

The support rib 236 has a cross-sectional area that enables the support rib 236 to sufficiently resist deformation of the support bracket 200 about the rounded corner 232 between the first and intermediate legs 204, 208. In one particular embodiment in which the support bracket 200 is formed of steel of approximately 0.088 inch thickness, the width of the support rib 236 may be between approximately 0.2 and approximately 0.75 inches wide, and in certain embodiments, approximately 0.25 inches wide or approximately 0.5 inches wide.

The support bracket 200 of FIGS. 5-8 is particularly simple to manufacture. In particular, the support bracket 200 is formed from an initial blank 201, shown FIG. 8. The blank 201 may, in one embodiment, have a size of approximately 1 inch wide by approximately 6.5 inches long. The holes 220, 248 are drilled through the blank and, if desired, tapped. Additionally, two parallel cuts 237 and one perpendicular connecting cut 238 are made through the material of the blank 201 so as to form a cantilevered flap 239. The cuts 237, 238 may be die cut, laser cut, plasma cut, water jet cut, or made by any other suitable cutting process.

Figure 7:
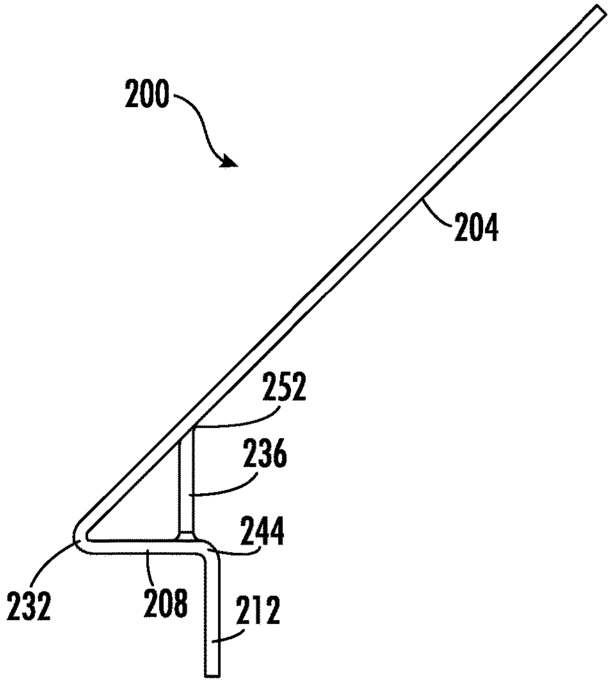
FIG. 7 is a left side view of the casket support bracket of FIG. 5.
Figure 8:
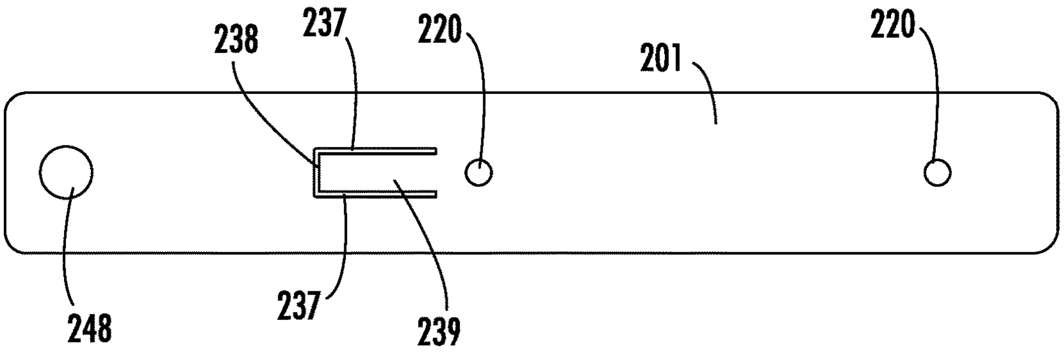
FIG. 8 is a front view of a casket support bracket blank before it has been bent to the shape of the casket support bracket of FIG. 5.

The flap 239 is then bent at the first and second corners 232, 244 into the shape best seen in FIG. 7 so as to form the first leg 204, the intermediate leg 208, and the second leg 212. The flap 239 is bent out of the plane of the first leg 204 so that it is parallel or substantially parallel to the plane formed by the second leg 212 and perpendicular or substantially perpendicular to the plane formed by the intermediate leg 208. The free end of the flap 239 lies essentially against the upper surface of the intermediate leg 208, where it is then materially joined to the intermediate leg 208, by for example welding, such that the flap 239 forms the support rib 236.

Figure 9:
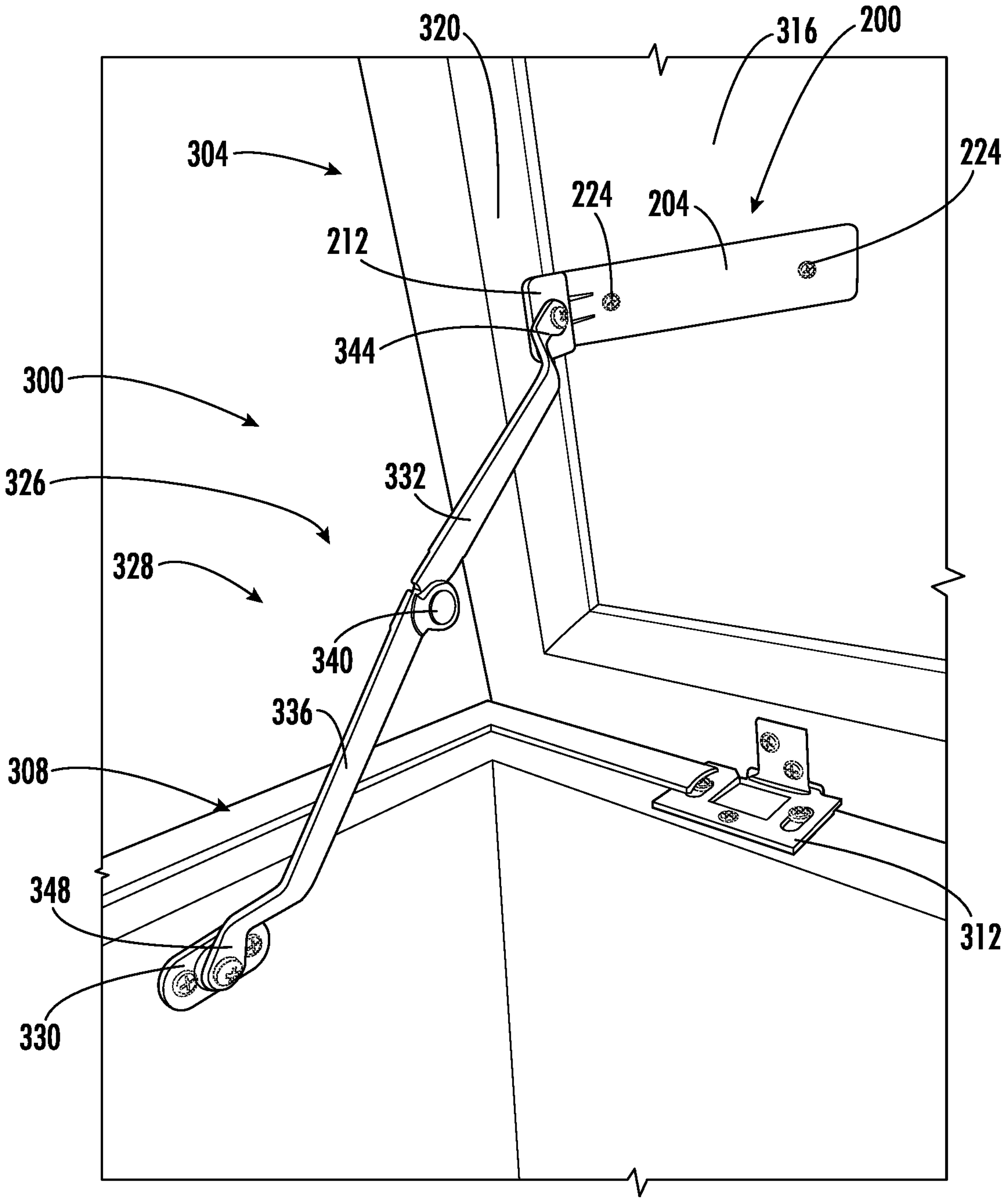
FIG. 9 is a perspective view of the casket support bracket of FIG. 5 installed on a casket lid.
Figure 10:
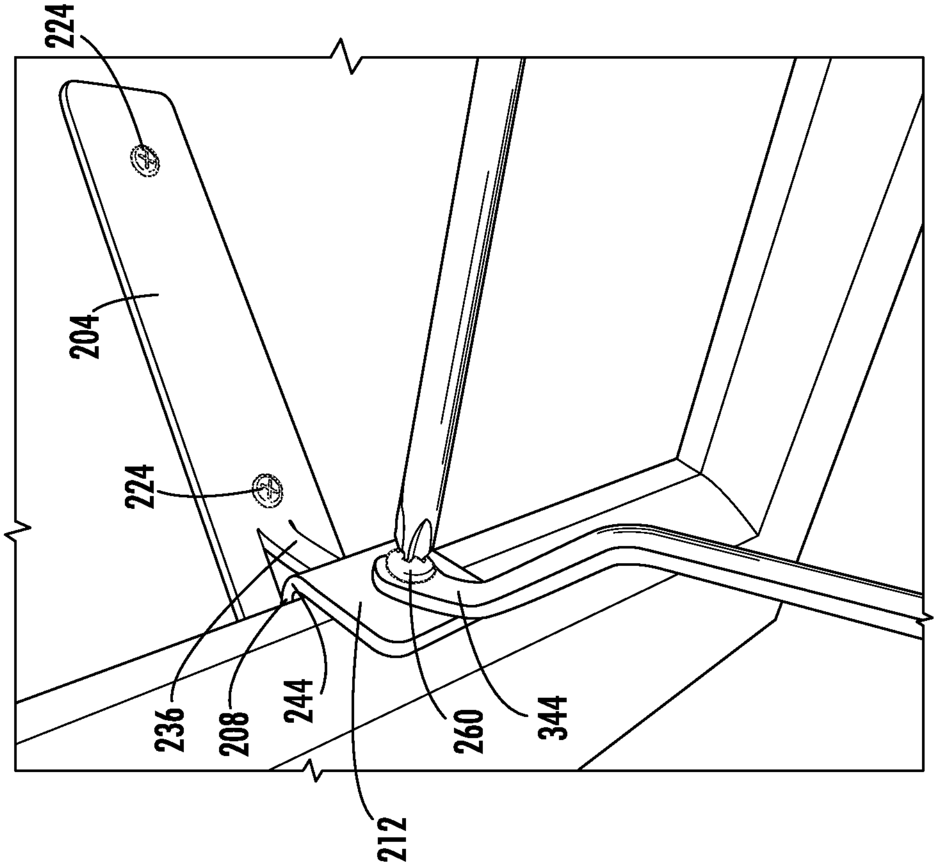
FIG. 10 is another view of the casket support bracket of FIG. 5 installed on the casket lid.
Figure 11:
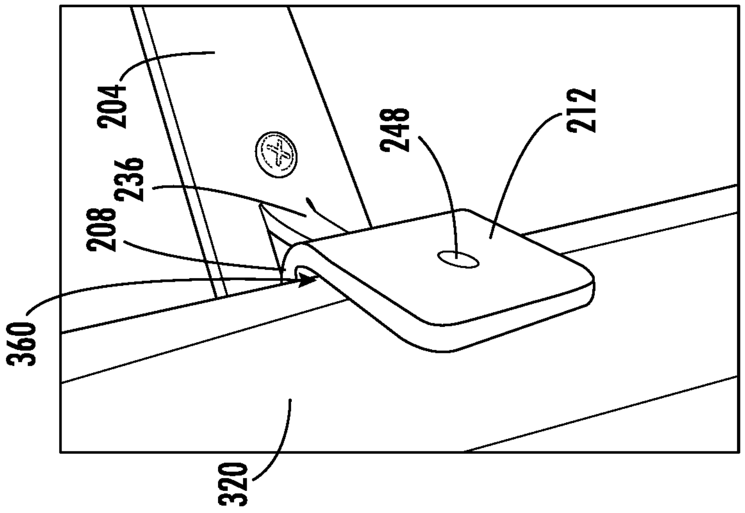
FIG. 11 is another view of the casket support bracket of FIG. 5 installed on the casket lid.

The support brackets 100, 200 are configured to be installed on a casket 300, which is illustrated in FIGS. 9-11. First, the general configuration of the casket 300 will be described. The casket 300 described herein is not intended to be limiting, as the support brackets 100, 200 may be installed on caskets having a variety of different configurations.

The casket 300 includes a casket lid 304 and a box 308. The casket lid 304 and the box 308 are connected to one another by at least one hinge 312 such that the casket lid 304 can open or close relative to the box 308 by pivoting about the at least one hinge 312. The casket lid 304 may be split into a head portion and a foot portion. The head portion is illustrated in FIGS. 9-11, though the reader should appreciate that the foot portion may be configured in a similar manner and the support brackets 100, 200 may be installed in a similar manner on the foot portion of the casket lid 304.

Figure 12:
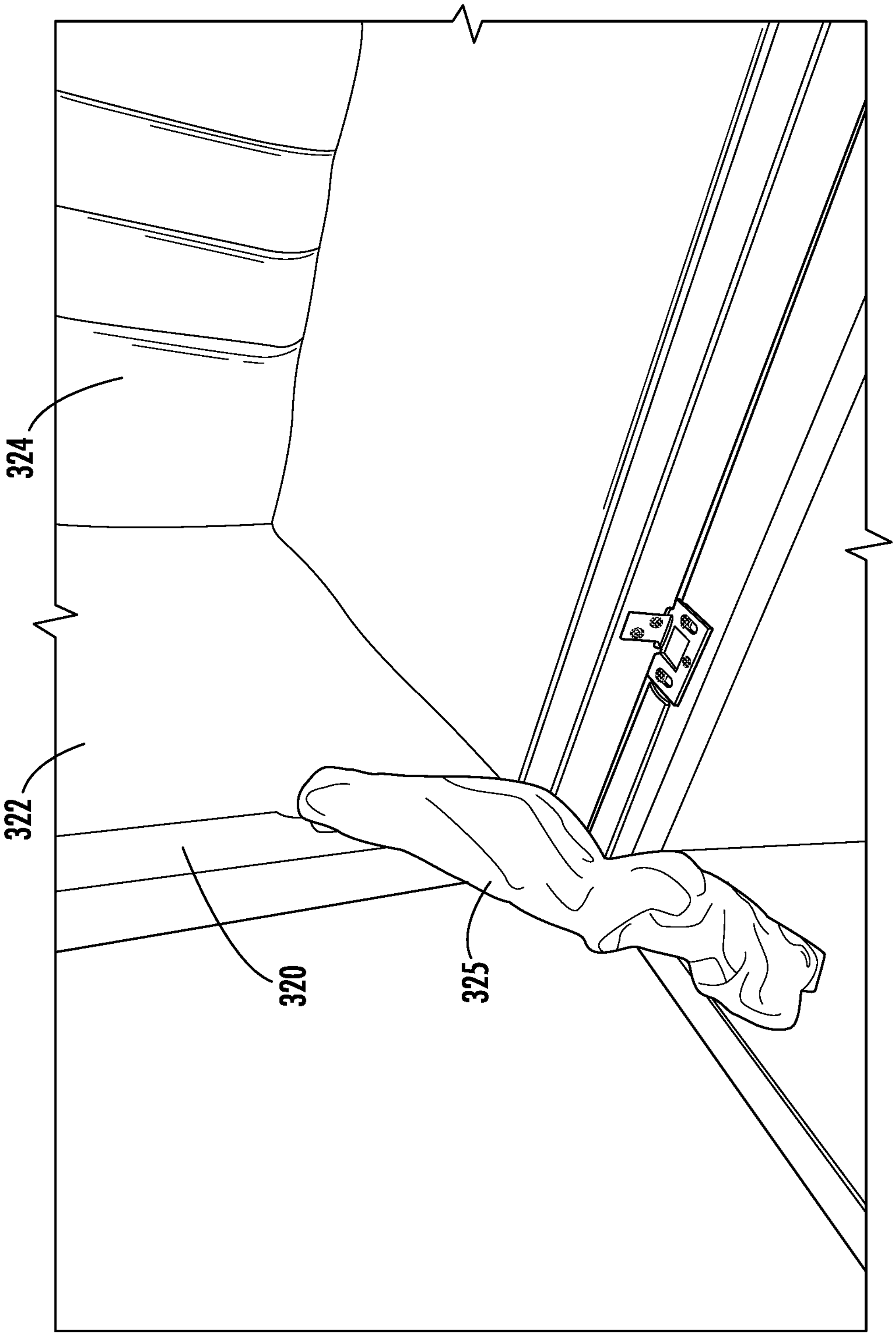
FIG. 12 is a view of the casket lid of FIG. 9 with the head roll and head panel installed over the casket support bracket.

The casket lid 304 includes a crown rail 316 at the head end of the casket 300 and a lid edge 320 that forms an inner rim of the casket lid 304. For aesthetic purposes, the interior of the head portion of the casket lid 304 is typically covered by a decorative assembly including a head panel 322 and head roll 324, while the lid support is typically covered by a piece of covering fabric 325 (see FIG. 12).

With reference now to FIG. 9, in some instances, it is desirable for the casket lid 304 to be propped open, for example during a funeral viewing. To prop the casket lid 304 open and to prevent it from inadvertently closing, a lid support arrangement 326 is arranged between the casket lid 304 and the frame of the box 308. The lid support arrangement 326 includes a lid support brace 328, a box connecting bracket 330, and the support bracket 100. In the embodiment illustrated in FIG. 9, the lid support brace 328 is a locking knee brace. In other embodiments, the lid support brace 328 may be any desired type of support, for example a hydraulic brace, e.g. a gas spring or gas strut (e.g., FIG. 19), or a friction locking brace.

In the embodiment depicted in FIGS. 9-11, the lid support brace 328 has two legs 332, 336 and a pivot joint 340 that can be locked to prevent the two legs 332, 336 from pivoting relative to one another. In the locked position in which the two legs 332, 336 are prevented from pivoting relative to one another, the two ends 344, 348 of the lid support brace 328 remain at a fixed distance from one another, thereby preventing the casket lid 304 from closing. When the pivot joint 340 is unlocked by, for example, being moved in a direction away from the hinge 312, the two legs 332, 336 are pivotable relative to one another, thereby allowing the lid end 344 to move toward the box end 348 to close the casket lid 304.

If, however, a user attempts to close the casket lid 304 by pulling downwardly on the casket lid 304 without unlocking the lid support brace 328, the pivot joint 340 does not permit the ends 344, 348 of the lid support brace 328 to move toward one another, and the lid support brace 328 therefore resists the downward force on the casket lid 304. In a conventional casket, the lid end 344 is mounted to the lid edge 320 by one or more screws. The downward force of the casket lid 304 and the resisting force of the lid support brace 328 cause the screws to exert a shear force on the relatively thin lid edge 320, which can cause damage to the wood of the lid edge 320.

The lid support arrangement 326 incorporating the support bracket 100, 200 reduces the potential for damage to the lid edge 320. In particular, the lid support arrangement 326 is shown and will be described below with reference to the support bracket 200, though the reader should appreciate that the support bracket 100 may be incorporated in the lid support arrangement 326 in a similar manner.

The support bracket 200 is mounted to the casket lid 304 such that the angled first leg 204 runs along the interior surface of the crown rail 316. The first leg 204 is securely mounted to the interior surface of the crown rail 316 by any suitable mounting arrangement. In the illustrated embodiment, a fastener 224, for example a wood screw, passes through each of the holes 120 so as to securely attach the first leg 104 to the crown rail 316. In other embodiments, the first leg 104 may be mounted to the crown rail 316 by, for example, a clamp, an adhesive, a friction connection, or any other suitable arrangement.

The intermediate leg 208 of the support bracket 200 is in contact with the top surface of the lid edge 320, while the second leg 212 extends substantially parallel to the vertical surface of the lid edge 320. The lid end 344 of the lid support brace 328 is fixed to the second leg 212 by a fastener 260. In the illustrated embodiment, for instance, the fastener 260 is a screw that passes through a through-hole in the lid end 344 of the lid support brace 328 and is threaded into the hole 248 of the second leg 212. In other embodiments, the second leg 212 may be connected to the lid end 344 of the lid support brace 328 by a bolt and nut (particularly when the hole 248 is an unthreaded hole), a welded connection, a clamped connection, or any other suitable connection.

As seen best in FIGS. 10 and 11, the second leg 212 is spaced apart from the lid edge 320 by a gap 360. As a result, the fastener 260 does not engage the lid edge 320. The reader should appreciate, however, that is some embodiments the second leg 212 may be adjacent to the lid edge 320 such that the fastener 260 passes partially into the lid edge 320.

Referring now to FIGS. 9-11, when installed, the support bracket 200 reduces the potential for damage to the casket 300 caused by inadvertently attempting to close the casket lid 304 without unlocking the lid support brace 328. If a closing force is applied to the casket lid 304 while the lid support brace 328 is locked, the closing force is transferred from the lid support brace 328 to the second leg 212 of the support bracket 100. The force is transmitted through the rounded corner 244 to the intermediate leg 208, and then along the support rib 236 to the first leg 204. Because the first leg 204 is braced against the surface of the crown rail 316, and the first leg 204 is securely mounted to the interior surface of the crown rail 316, the force is dissipated in the crown rail 316 without causing damage to the casket lid 304. In particular, in the illustrated embodiment, the fasteners 224 are affixed in the relatively wide crown rail 316, which can sufficiently resist the shear force applied by the fasteners.

As such, by transferring the mounting of the lid support brace 328 from the lid edge 320 to the crown rail 316, the support brace 200 enables the casket lid 304 to resist excessive forces applied to the casket lid 304 by the lid support brace 328 without causing damage to the casket lid 304. Moreover, because the support bracket 200 is spaced apart from the lid edge 320 by the gap 360, the support bracket 200 can be installed without connecting to the lid edge 320. As a result, the support bracket 200 can be mounted to the casket lid 304 even if the lid edge 320 has been previously damaged and is no longer suitable for mounting the lid support brace 328.

FIG. 13 illustrates another embodiment of a support bracket 400 in which the first and second legs 404, 412 are connected to one another without an intermediate leg. In other words, the first and second legs 404, 412 are directly connected to one another with, at most, a corner joint separating the first and second legs 404, 412. In the embodiment of FIG. 13, the first and second legs 404, 412 are again at an angle 416 of between approximately 125 and 145 degrees relative to one another, and in one specific embodiment, are at an angle of approximately 135 degrees relative to one another. Thus, the support bracket 400 can be installed on a casket having little or no overhang of the lid edge. Alternatively, the support bracket 400 can be installed on the casket 300 with an overhanging lid edge 320 in such a way that the second leg 412 runs near to or slightly spaced apart from the lid edge 320 and runs vertically until meeting the crown rail 316, where the first leg 404 runs along the inner surface of the crown rail. While no support rib is depicted in the embodiment shown in FIG. 13, the reader should appreciate that a triangularly-shaped support rib may be included running vertically along the centerline of the first and second legs 404, 412 for additional support.

Figure 14:
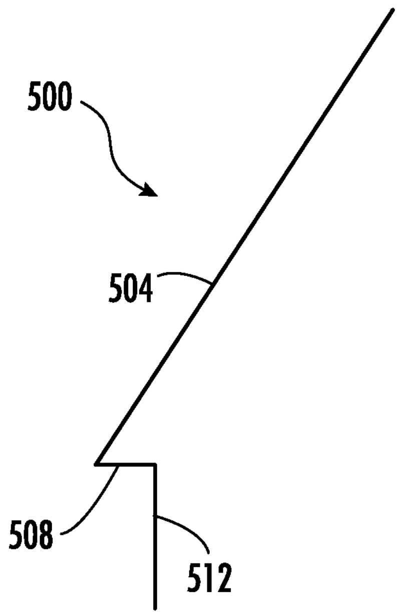
FIG. 14 is a side view of another casket support bracket according to the disclosure.

FIG. 14 depicts another embodiment of a support bracket 500 similar to the support brackets 100, 200 illustrated in FIGS. 1-8. In contrast to the previously discussed support brackets 100, 200, however, the intermediate leg 508 of the support bracket 500 is shorter compared to the first and second legs 504, 512. In particular, the intermediate leg 508 in the embodiment of FIG. 14 may be approximately 0.25 inches, while the remaining dimensions of the support bracket 500 are similar to the embodiments of FIGS. 1-8.

Figure 15:
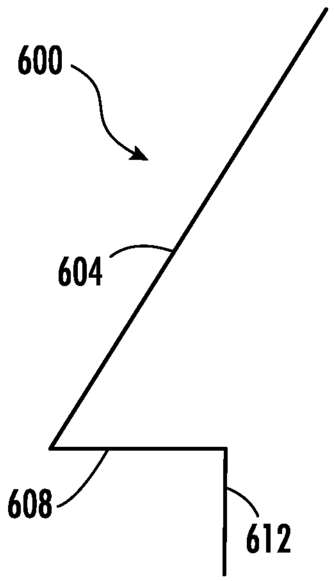
FIG. 15 is a side view of another casket support bracket according to the disclosure.

FIG. 15 depicts a further embodiment of a support bracket 600 similar to the support brackets 100, 200 illustrated in FIGS. 1-8. The support bracket 600 of FIG. 15 differs from the support brackets 100, 200 in that the support bracket 600 does not include a support rib between the first leg 604 and the intermediate leg 608. The support rib may be omitted when, for example, the support bracket 600 is formed of a thicker, wider, or stronger material, and/or the load passed from the second leg 612 to the first leg 604 is resisted sufficiently by the support bracket 600 such that deformation will not occur at the corner between the first leg 604 and the intermediate leg 608.

All of the support brackets 400, 500, 600 are used in a similar manner as the support brackets 100, 200 described above. Additionally, while the support brackets 100, 200, 400, 500, 600 disclosed herein are shown as being attached to the head end of the casket 304, the reader should appreciate that the support brackets 100, 200, 400, 500, 600 may also be installed at the foot end of the casket lid in a similar manner as described above.

Figure 18:
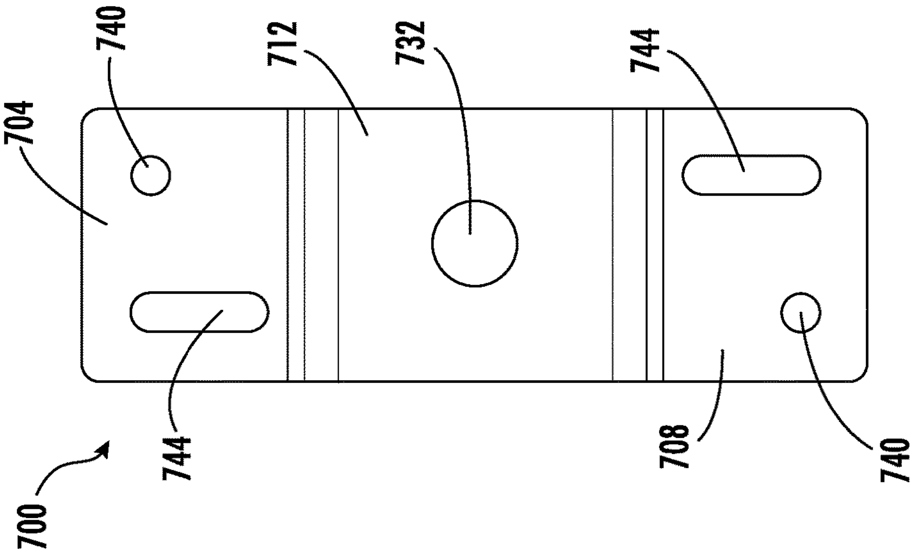
FIG. 18 is a front view of the box connecting bracket of FIG. 16.
Figure 17:
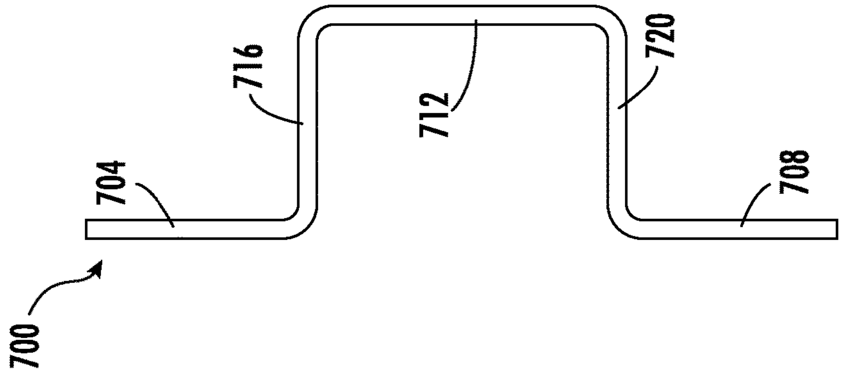
FIG. 17 is a left side view of the box connecting bracket of FIG. 16.
Figure 16:
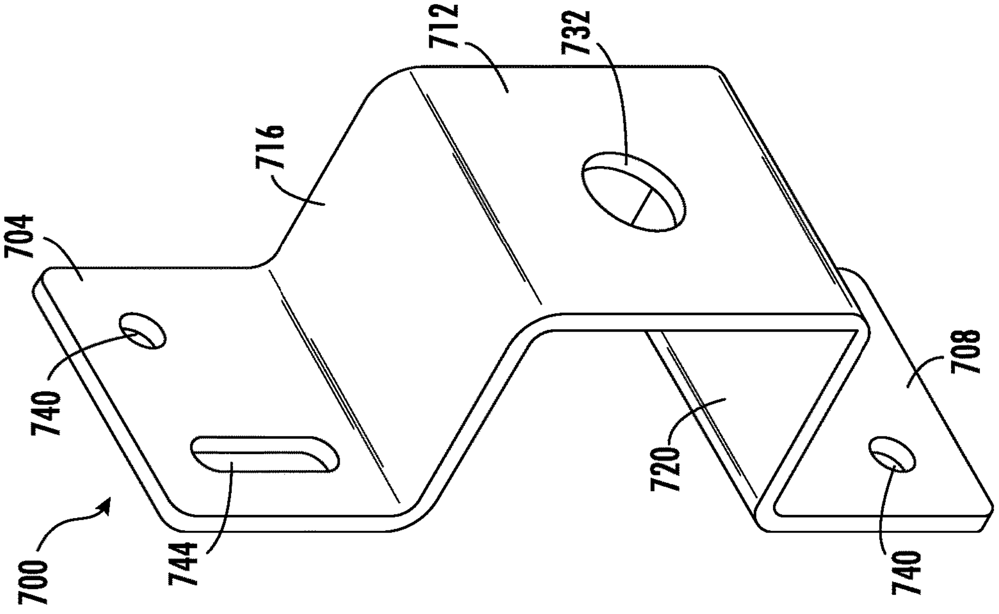
FIG. 16 is a perspective view of a box connecting bracket according to the disclosure.
Figure 19:
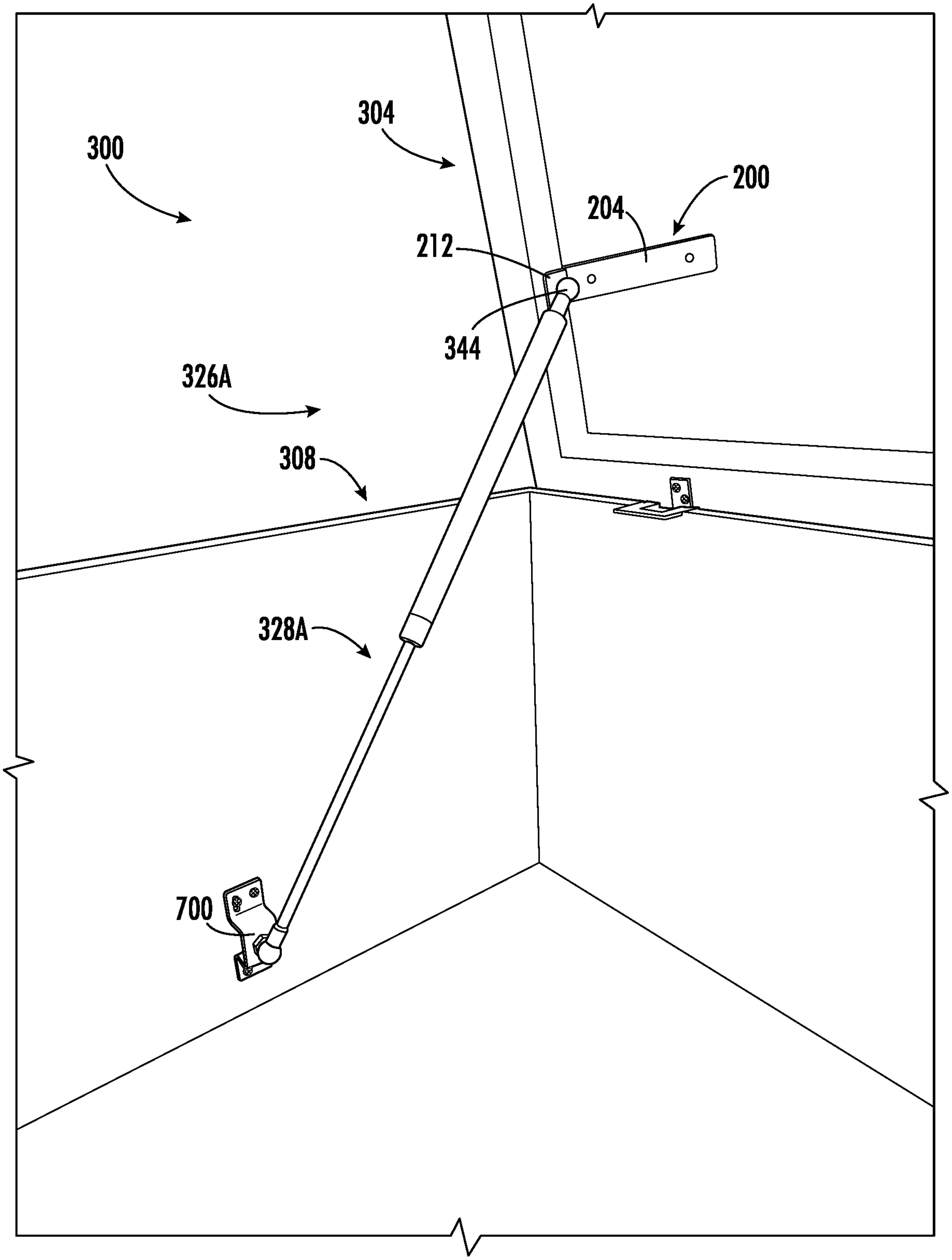
FIG. 19 is a perspective view of the box connecting bracket of FIG. 16 and the casket support bracket of FIG. 5 installed on a casket lid having a gas spring lid support brace.

FIGS. 16-18 illustrate an adjustable box connecting bracket 700 that connects the bottom portion of the lid support brace 328A to the box 308 of the casket 300. The box connecting bracket 700 may be, in particular, used in embodiments in which the support brace is a gas spring 328A (FIG. 19). The bottom bracket is formed as a bent sheet metal component having two end flanges 704, 708 arranged in a common plane. Between the two end flanges 704, 708 is a middle portion 712 that is arranged in a plane parallel to and offset from the common plane of the two end flanges 704, 708. The middle portion 712 is connected to the two end flanges 704, 708 by two connecting legs 716, 720, such that the box connecting bracket 700 is formed as an integral monolithic component of a single piece of sheet metal.

The middle portion 712 includes a through hole 732 arranged approximately centrally in the middle portion 712. The through hole 732 enables a bolted connection or a bearing connection to the lid support brace 328 such that the box connecting bracket 700 mounts the lid support brace 328 to the box 308.

Each of the end flanges 704, 708 has one through hole 740 and one elongated slot 744 that is oriented parallel to a longitudinal direction of the box connecting bracket 700. The end flanges 704, 708 are each configured such that a fastener, e.g., a screw or a bolt, can be installed through the slot 744 and into the box 308 of the casket 300. When the fasteners are installed through the slots 744 with slight play, the box connecting bracket 700 still has one degree of freedom of movement, namely along the direction of the slots 744, but is restricted from movement in any other direction. Once the box connecting bracket 700 is in the desired position, additional fasteners may be installed through the holes 740 and/or the fasteners in the slots 744 may be tightened to fix the box connecting bracket 700 securely on the box 308.

When the adjustable box connecting bracket 700 is used in a lid support arrangement 326A having an adjustable lid support brace 328A, for example a gas spring, the adjustable box connecting bracket 700 allows the position of the lid support brace 328A to be moved along the direction of the slots 744 by as much as the length of the slots 744 simply by loosening and re-tightening the fasteners located in the slots 744. Specifically, the box connecting bracket 700 can be moved so as to shorten the lid support brace 328A to increase the force applied by the lid support brace 328 to hold the casket lid 304 open, and the box connecting bracket 700 can be moved to lengthen the lid support brace 328A to reduce the force applied by the lid support brace 328A to hold the casket lid 304 open. This allows the resistance provided by the lid support brace 328A to be easily changed to provide the desired amount of resistance to prevent the casket lid 304 from inadvertently closing, but allowing for the casket lid 304 to be closed by user applying a relatively small downward force on the casket lid 304.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

The invention claimed is:

1. A lid support arrangement for supporting a casket lid of a casket, comprising:
- a lid support brace configured to operably connect to a box of the casket; and
- a support bracket comprising:
- a first leg configured to mount to an interior surface of a crown rail of the casket lid;
- a second leg connected in a fixed position with respect to the first leg and connected to the lid support brace; and
- a support rib connected to the first leg and extending in a direction toward the second leg.

2. The lid support arrangement of claim 1, the support bracket further comprising an intermediate leg connecting the first leg to the second leg, wherein the support rib extends from the first leg to the intermediate leg and is fixedly connected to the intermediate leg.

3. The lid support arrangement of claim 2, wherein the second leg is configured to be spaced apart from the casket lid.

4. The lid support arrangement of claim 2, wherein the lid support brace comprises a knee brace.

5. The lid support arrangement of claim 2, wherein the lid support brace is configured as a gas spring.

6. The lid support arrangement of claim 5, further comprising a box connecting bracket configured to mount to the box of the casket and to which an end of the lid support brace is mounted, the box connecting bracket including at least two slots that are parallel to one another and configured to be adjustable along a direction defined by the at least two slots.

7. A casket comprising:
- a box portion;
- a casket lid having a crown rail; and
- a lid support arrangement comprising:
- a lid support brace operably connected to the box portion casket; and
- a support bracket comprising:
  - a first leg configured to mount to an interior surface of the crown rail of the casket lid;
  - a second leg connected in a fixed position with respect to the first leg and to the lid support brace; and
  - support rib connected to the first leg and extending in a direction toward the second leg.

8. The casket of claim 7, the support bracket further comprising an intermediate leg connecting the first leg to the second leg, wherein the support rib extends from the first leg to the intermediate leg and is fixedly connected to the intermediate leg.

9. The casket of claim 8, wherein the second leg of the support bracket is spaced apart from the casket lid.

* * * * *